July 22, 1952     E. B. PARKES     2,603,812
VEHICLE WINDSCREEN WIPER
Filed July 30, 1951

Inventor
E. B. Parkes

Patented July 22, 1952

2,603,812

UNITED STATES PATENT OFFICE 2,603,812

VEHICLE WINDSCREEN WIPER

Eric Bernard Parkes, Selly Oak, Birmingham, England, assignor to Joseph Lucas Limited, Birmingham, England Application July 30, 1951, Serial No. 239,261
In Great Britain August 3, 1950

1 Claim. (Cl. 15—250)

This invention relates to vehicle windscreen wipers of the oscillatory-arm type, and has for its object to provide a simple coupling for attaching the wiper blade to the arm, and enabling the wiper blade to swivel relatively to the arm about two axes which are mutually at right angles.

A coupling embodying the invention comprises a small hollow knob of substantially rectangular form and adapted to be placed over the outer end of the arm, a claw on the knob adapted to engage a hole in the arm, a substantially T-shaped trunnion having its head enclosed by the knob and its stem extending through a hole in one side of the knob, the outer end of the stem being adapted for the attachment thereto of the blade holder, and a spring for retaining the claw in engagement with the arm and for pressing the head of the trunnion against the adjacent side of the knob, the said side having therein a concave surface on which rounded surfaces on the head of the trunnion can rock.

Figure 1:
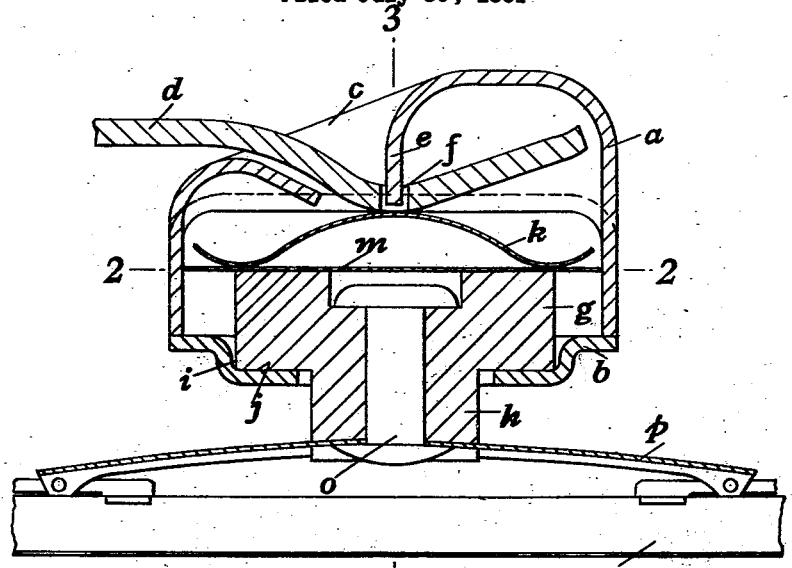
Figure 2:
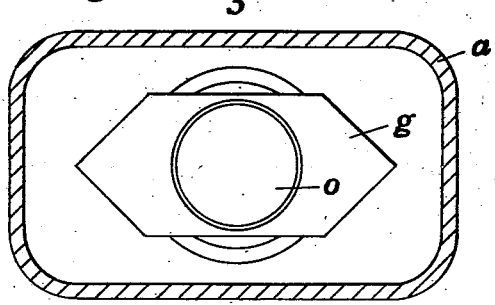
Figure 3:
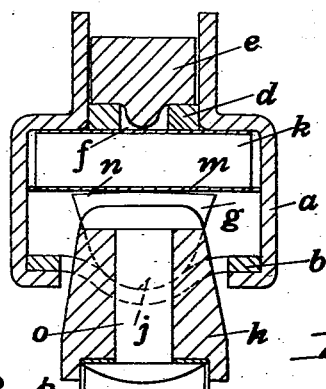

In the accompanying drawings:

Figure 1 is a sectional side elevation, Figure 2 a sectional plan on the line 2—2 (Figure 1), and Figure 3 a cross section on the line 3—3 (Figure 1) illustrating to an enlarged scale, one embodiment of the invention.

Referring to the drawings, the knob is made from a pair of sheet metal parts a, b. The part a is of box-like form and is of substantially rectangular shape. The part b encloses the open side of the part a, and is secured to it in any convenient manner. The closed side of the part a has formed in it an aperture recess c for enabling the knob to be placed over the outer end of the wiper arm d, and extending inwardly from this side is a claw e adapted to enter a rectangular hole f in the arm.

In the knob is contained the head g of a substantially T-shaped trunnion, the stem h of which extends through a relatively large hole in the part b of the knob. Also the part b of the knob is shaped to provide at its inner side a longitudinal recess i presenting a concave surface to the head of the trunnion, the latter having rounded surfaces j which can lie in the recess.

Between the head of the trunnion and the adjacent end of the arm d is placed a bowed spring blade k which serves to hold the arm in engagement with the claw e and also to press the head g of the trunnion against the recessed side of the knob. Preferably a thin shim m is also placed between the spring blade and the head of the trunnion and the side of the latter in contact with the shim is shaped to a shallow V-form (Figure 3) presenting a longitudinal central ridge n to the shim. Further the head g of the trunnion is preferably shaped to a diamond form as shown in Figure 2, so that its extent of angular movement can be limited by contact of its ends with the inner side walls of the knob a.

The outer end of the stem h of the trunnion is adapted for the attachment thereto, by a screw or rivet o, of the holder p which carries the flexible wiper blade q.

The arrangement is such that when the knob is in position on the arm it is rigidly held by the claw, but the trunnion is capable of rocking relatively to the knob about two axes which are mutually at right angles. The one axis is that of the stem of the trunnion, and movement about this axis enables the wiper blade to be rocked to either side of the longitudinal centre line of the arm. When this movement occurs, the rounded parts of the head of the trunnion ride up the sides of the concave recess in the knob, against the action of the spring, and the said parts are subsequently returned to their normal position in the recess by the spring. This movement occurs when the blade is moved to its parking position by the arm, or (by the engagement of the blade holder with a stop) when the arm reaches either end of each oscillatory movement.

The other axis coincides with the base of the recess in the knob. Movement about the axis occurs when the direction of motion of the blade across the windscreen is reversed at the end of each oscillatory movement of the arm, to enable the plane of the blade to take up an inclined position relatively to the surface of the windscreen.

By this invention the interconnection of the arm and blade, and the swivelling of the blade on the arm, are effected in a very smiple and convenient manner.

Having this described my invention what I claim as new and desire to secure by Letters Patent is:

A coupling for attaching the wiper blade to the oscillatory arm of a vehicle wind-screen wiper, comprising a hollow knob of substantially rectangular form and adapted to be placed over the outer end of the arm, a claw on the knob adapted to engage a hole in the arm, a substantially T-shaped trunnion having its head enclosed by the knob and its stem extending through a hole in one side of the knob, the outer end of the stem being adapted for the attachment thereto of the blade holder, and a spring for retaining the claw in engagement with the arm and for pressing the head of the trunnion against the adjacent side of the knob, the said side having therein a concave surface on which rounded surfaces on the head of the trunnion can rock.

ERIC BERNARD PARKES.

No references cited.